(12) United States Patent
Yoshioka et al.

(10) Patent No.: US 9,007,487 B2
(45) Date of Patent: Apr. 14, 2015

(54) CAMERA MODULE, EXPOSURE ADJUSTING METHOD OF CAMERA MODULE, AND ELECTRONIC EQUIPMENT

(71) Applicant: Kabushiki Kaisha Toshiba, Tokyo (JP)

(72) Inventors: You Yoshioka, Tokyo (JP); Naoto Mihara, Kanagawa (JP); Junichi Hosokawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 159 days.

(21) Appl. No.: 13/760,440

(22) Filed: Feb. 6, 2013

(65) Prior Publication Data

US 2014/0016022 A1    Jan. 16, 2014

(30) Foreign Application Priority Data

Jul. 13, 2012  (JP) .................................. 2012-157629

(51) Int. Cl.
*H04N 5/235*    (2006.01)
*H04N 5/225*    (2006.01)

(52) U.S. Cl.
CPC ........... *H04N 5/2353* (2013.01); *H04N 5/2351* (2013.01); *H04N 5/2254* (2013.01)

(58) Field of Classification Search
CPC ... H04N 5/2353; H04N 5/2351; H04N 5/235; H04N 5/2352; H04N 5/2355
USPC ....................................................... 348/362
See application file for complete search history.

(56) References Cited

U.S. PATENT DOCUMENTS

| 5,162,913 | A | 11/1992 | Chatenever et al. |
| 7,830,446 | B2 * | 11/2010 | Ueyama ........................ 348/362 |
| 8,274,598 | B2 * | 9/2012 | Hirose .......................... 348/362 |
| 2005/0264682 | A1 * | 12/2005 | Kurane .......................... 348/362 |
| 2011/0181754 | A1 * | 7/2011 | Iwasaki ...................... 348/230.1 |
| 2011/0317063 | A1 * | 12/2011 | Toguchi ........................ 348/363 |

FOREIGN PATENT DOCUMENTS

| JP | 2594706 | 12/1996 |
| JP | 2642669 | 5/1997 |
| JP | 4720118 | 4/2011 |

* cited by examiner

*Primary Examiner* — Ahmed A Berhan
*Assistant Examiner* — Fayez Bhuiyan
(74) *Attorney, Agent, or Firm* — Oblon, McClelland, Maier & Neustadt, L.L.P.

(57) ABSTRACT

According to one embodiment, a camera module has an exposure control unit. When an exposure error has reached within a coring range by first exposure control, the exposure control unit switches exposure control from the first exposure control to second exposure control. The exposure error shows a deviation of an exposure evaluation value to an exposure target value. In the second exposure control, an exposure change amount is reduced than at the time of the first exposure control. When the exposure error has reached a zero level by the second exposure control, the exposure control unit stops the exposure control.

20 Claims, 7 Drawing Sheets

CAMERA MODULE, EXPOSURE ADJUSTING METHOD OF CAMERA MODULE, AND ELECTRONIC EQUIPMENT

CROSS-REFERENCE TO RELATED APPLICATIONS

This application is based upon and claims the benefit of priority from Japanese Patent Application No. 2012-157629, filed on Jul. 13, 2012; the entire contents of all of which are incorporated herein by reference.

FIELD

Embodiments described herein relate generally to a camera module, an exposure adjusting method of a camera module, and electronic equipment.

BACKGROUND

Conventionally, as one of functions of a camera module, there is known an automatic exposure (AE) function for automatically determining an exposure in accordance with brightness of an object and a background. For example, as a first method that is one of AE control methods, there is a method of executing an adjustment to a correct exposure by executing proportional control of an exposure and continuing the proportional control even after the exposure is adjusted to the correct exposure. As a second method that is the other method of AE control methods, there is a method of stopping exposure control when it is detected that a state near to the correct exposure has been reached and resuming the exposure control when the state has been largely deviated from the correct exposure.

According to the first method, even after an exposure change is converged, since the exposure control is executed following even a slight change of brightness, brightness of a picked-up image is repeatedly increased and decreased. Since brightness of a screen is changed at every moment even if an image is not largely changed, a viewer may feel uncomfortable. According to the second method, since an exposure value at the time the exposure control is stopped is deviated from the correct exposure by a predetermined value, a state in which the correct exposure has not been reached continues.

DETAILED DESCRIPTION

In general, according to one embodiment, a camera module has an exposure evaluation value generating unit, an exposure error calculating unit, and an exposure control unit. The exposure evaluation value generating unit executes a light amount measurement using an image signal obtained by picking up an object image. The exposure evaluation value generating unit generates an exposure evaluation value. The exposure evaluation value is a result of the light amount measurement. The exposure error calculating unit calculates an exposure error. The exposure error shows a deviation of the exposure evaluation value to an exposure target value which is set to a correct exposure. The exposure control unit executes exposure control in an exposure change amount according to the exposure error. The exposure control unit allows the exposure control, which converges the exposure error to a zero level, to be switched between first exposure control and second exposure control. The first exposure control is proportional control for causing the exposure change amount to be proportional to the exposure error. The exposure change amount is made smaller in the second exposure control than in the first exposure control and is also made constant. The exposure control unit defines the exposure control when the exposure error calculated by the exposure error calculating unit is out of a coring range as the first exposure control. The coring range is set including the zero level. When the exposure error has been reached within the coring range by the first exposure control, the exposure control unit switches the exposure control from the first exposure control to the second exposure control. The exposure control unit stops the exposure control from a time at which the exposure error has been reached to the zero level by the second exposure control to a time at which the exposure error has been out of the coring range.

Exemplary embodiments of a camera module, an exposure adjusting method of a camera module, and electronic equipment will be explained below in detail with reference to the accompanying drawings. The present invention is not limited to the following embodiments.

Figure 1:
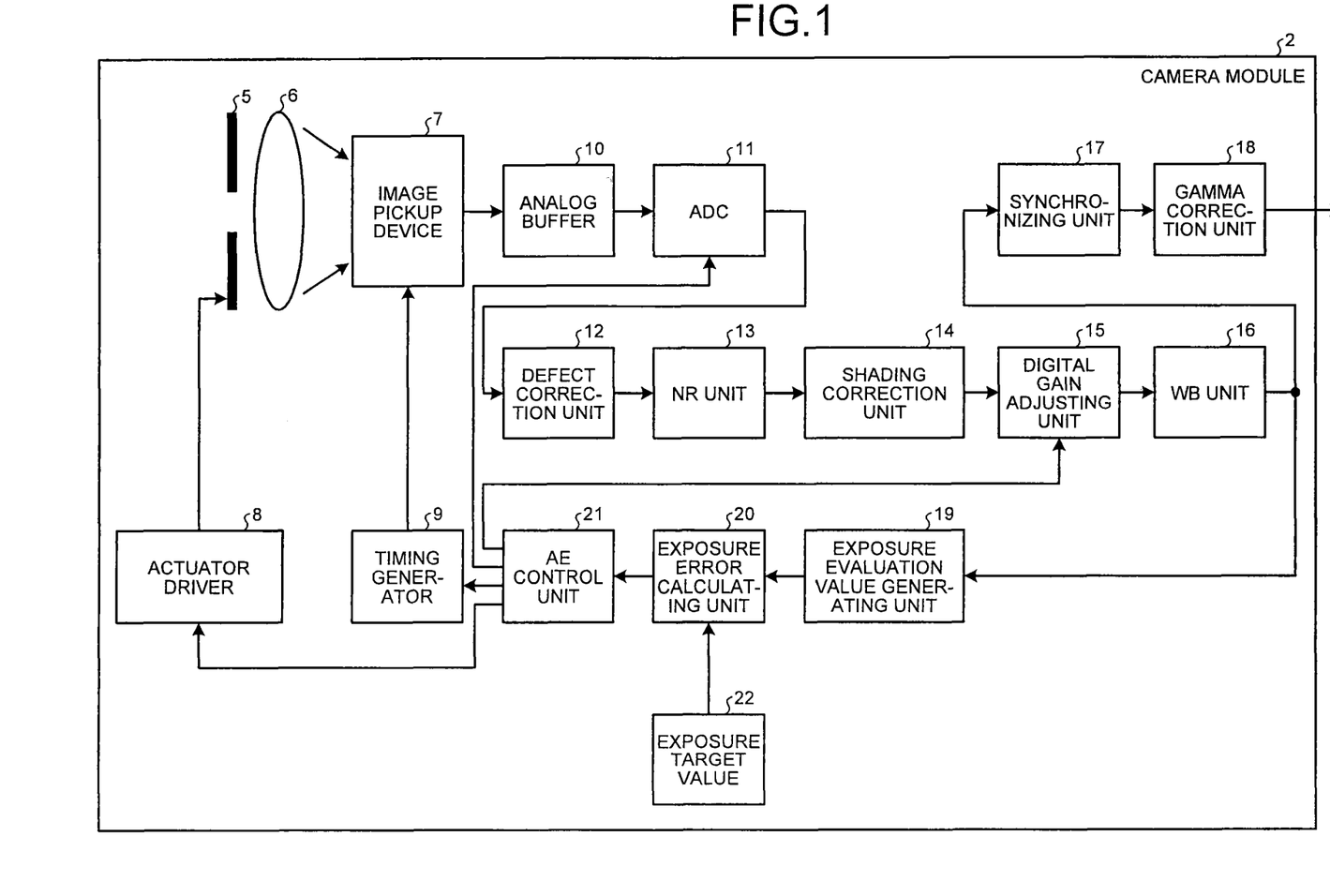
FIG. 1 is a block diagram illustrating a schematic configuration of a camera module according to a first embodiment.
Figure 2:
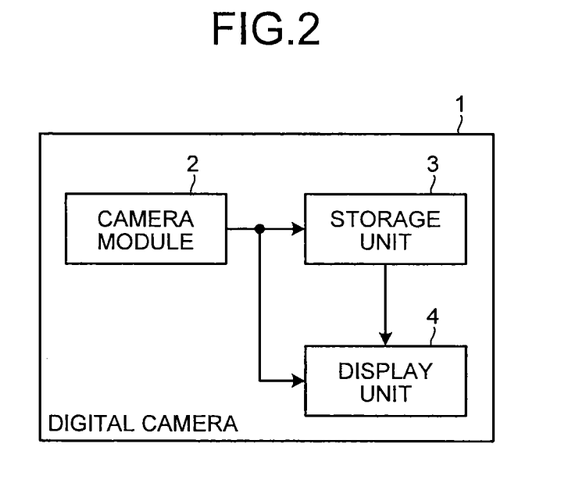
FIG. 2 is a block diagram illustrating a schematic configuration of a digital camera having the camera module illustrated in FIG. 1.

FIG. 1 is a block diagram illustrating a schematic configuration of a camera module according to a first embodiment. FIG. 2 is a block diagram illustrating a schematic configuration of a digital camera having the camera module illustrated in FIG. 1. The camera module 2 is used in electronic equipment, for example, a mobile terminal with a camera, in addition to the digital camera 1.

The digital camera 1 has the camera module 2, a storage unit 3, and a display unit 4. The camera module 2 picks up an object image. The storage unit 3 stores an image picked up by the camera module 2. The display unit 4 displays the image picked up by the camera module 2. The display unit 4 is, for example, a liquid crystal display.

The camera module 2 outputs an image signal to the storage unit 3 and the display unit 4 by picking up the object image. The storage unit 3 outputs the image signal to the display unit 4 according to an operation of a user. The display unit 4 displays an image according to the image signal input from the camera module 2 or the storage unit 3.

A diaphragm 5 adjusts an amount of light incident from an object by opening and closing the diaphragm 5. An actuator driver 8 increases and decreases a current supplied to a voice coil motor (illustration is omitted) for opening and closing the diaphragm 5 to thereby adjust an opening of the diaphragm 5. A pickup lens 6 captures the light from the object and focuses an object image on a light receiving surface of an image pickup device 7.

The image pickup device 7 has phototransistors disposed two-directionally and charge transfer units disposed following the phototransistors (illustration of any of them is omitted). The image pickup device 7 converts the light incident on the phototransistors via R (red), G (green), and B (blue) color filters to signal charges. Note that the camera module 2 may be provided with any of a CMOS (complementary metal oxide semiconductor) image sensor and a CCD (charge coupled device).

In the image pickup device 7, charge accumulation switches of the phototransistors are operated from each column thereof from above a screen in response to a timing signal from a timing generator 9 and the phototransistors accumulate charges for a predetermined exposure time. The image pickup device 7 changes photoelectrons accumulated as the charges to a voltage by a junction capacitance and converts the voltage to an analog image signal. An analog buffer 10 converts the analog image signal to an analog image signal having a low impedance.

An analog digital converter (ADC) 11 converts the image signal obtained by picking up the object image from an analog system to a digital system. The ADC 11 makes it possible to change voltage sensitivity in the AD conversion by control executed from the outside. The ADC 11 makes a gain of an AD-converted output to a photoelectron amount variable. In the ADC 11, the gain is adjusted so that a saturated electron amount when output charges are saturated to an incident light amount becomes a full scale in the AD-converted output.

A defect correction unit 12 corrects a defective portion (defect) of a digital image signal that is caused by a pixel which does not normally function by interpolating data of peripheral pixels. A noise reduction (NR) unit 13 executes a noise cancel process for reducing noise. The NR unit 13 suppresses a dispersion of cut-off levels of each line by a noise cancel process. A shading correction unit 14 executes a shading correction for correcting a reduction of brightness in the periphery of a screen.

A digital gain adjusting unit 15 adjusts brightness of the object image by multiplying the digital image signal by a gain. The adjustment in the digital gain adjusting unit 15 and the sensitivity change in the ADC 11 are the same in an effect of changing the gain, whereas an influence thereof on an increase of noise and on a change of quantization distortion is different.

A white balance (WB) unit 16 executes a white balance adjustment according to a color temperature of a light source. A synchronizing unit 17 creates RGB signals as to respective pixels by an interpolation process (demosaic process) of the digital image signal. A gamma correction unit 18 executes a gamma correction for correcting image gradation to the RGB signals.

An exposure evaluation value generating unit 19 measures a light amount using the image signal having been subjected to the signal processes up to the WB unit 16. The exposure evaluation value generating unit 19 generates an exposure evaluation value that is a result of measurement of the light amount. The exposure evaluation value generating unit 19 integrates, for example, luminance values obtained from the respective pixels as to the entire screen and uses a result of the integration as the exposure evaluation value.

The exposure evaluation value generating unit 19 may determine the exposure evaluation value by appropriately setting a weighting according to a position in the screen. The exposure evaluation value generating unit 19 determines a range in the screen to which importance is attached in the exposure evaluation according to various light measuring systems and adjusts the weighting so that the range to which the importance is attached has a larger weighting.

When, for example, the light amount is measured by "a center-emphasized light measurement", the exposure evaluation value generating unit 19 sets a larger weighting to a range nearer to a center. When the light amount measurement is executed by "a spot light measurement", the exposure evaluation value generating unit 19 sets a large weighting in a spot region designated from inside the screen. When the light amount measurement is executed by an "average light measurement" the exposure evaluation value generating unit 19 sets a constant weighting in the entire screen. When the light amount measurement is executed by "an evaluation light measurement", the exposure evaluation value generating unit 19 divides the screen to plural regions and sets a weighting using a result of evaluation of the light amount of each region.

The exposure evaluation value generating unit 19 is not limited to the case in which the weighting is set by a fixed mode in each light measuring system. The exposure evaluation value generating unit 19 may set a weighting of a position of the object which is focused large in association with, for example, an auto focus function. The exposure evaluation value generating unit 19 may set a weighting of a position at which a face is detected large in association with, for example, a face detecting function. When, for example, an illuminating light source is included in the screen, the exposure evaluation value generating unit 19 may determine the exposure evaluation value excluding a position of the illuminating light source.

An exposure error calculating unit 20 calculates an exposure error. The exposure error shows a deviation of the exposure evaluation value created by the exposure evaluation value generating unit 19 to an exposure target value 22. The exposure target value 22 is an exposure value when the correct exposure is achieved and used as a target value in exposure control.

An automatic exposure (AE) control unit 21 executes the exposure control according to the exposure error calculated by the exposure error calculating unit 20. The AE control unit 21 integrally controls the actuator driver 8, the timing generator 9, the ADC 11, and the digital gain adjusting unit 15 for the exposure control. The AE control unit 21 uses four factors i.e. an opening of the diaphragm 5, an exposure time of the image pickup device 7, AD sensitivity of the ADC 11, and a digital gain of the digital gain adjusting unit 15 as control targets.

The actuator driver 8 adjusts the opening of the diaphragm 5 in response to a diaphragm control signal from the AE control unit 21. The actuator driver 8 increases and decreases the current supplied to the voice coil motor for opening and closing the diaphragm 5 and executes local control of the diaphragm 5 so that a necessary opening is set.

The timing generator 9 adjusts the exposure time of the image pickup device 7 by outputting the timing signal in response to an exposure time control signal from the AE control unit 21. The image pickup device 7 increases and decreases accumulated charges in proportion to the exposure time.

The ADC 11 adjusts the voltage sensitivity in the AD conversion in response to an AD sensitivity control signal. The ADC 11 can obtain a large digital conversion value even by a small amount of photoinduced charge by reducing the voltage sensitivity and can increase an exposure. The ADC 11 can increase the gain without reducing a resolution of the AD conversion, whereas the ADC 11 may increase analog noise from a charge transfer system.

The digital gain adjusting unit 15 adjusts the gain multiplied by the digital image signal in response to the digital gain control signal. The digital gain adjusting unit 15 does not increase the analog noise from the charge transfer system, whereas the digital gain adjusting unit 15 may increase a digital quantization error.

The diaphragm 5, the image pickup device 7, the ADC 11, and the digital gain adjusting unit 15 which are used by the AE control unit 21 as the control targets are disposed in series in a signal processing process from a capture of light in the camera module 2. When the control executed by the AE control unit 21 is integrated, an exposure value is finally in proportion to a product obtained by multiplying control amounts to the four factors. Accordingly, the AE control unit 21 may appropriately change a distribution of the control amounts to the respective factors according to an image pick-up condition and the like.

The AE control unit 21 is not limited to an AE control unit which uses all the four factors i.e. the opening of the diaphragm 5, the exposure time of the image pickup device 7, the AD sensitivity of the ADC 11, and the digital gain of the digital gain adjusting unit 15 as the control targets. The AE control unit 21 may use at least any of the four factors as a control target.

Note that a configuration of the camera module 2 explained in the embodiment is an example and may be appropriately modified. The camera module 2 may add, for example, a factor different from the factors shown in the embodiment or may omit a factor that can be omitted.

Figure 3:
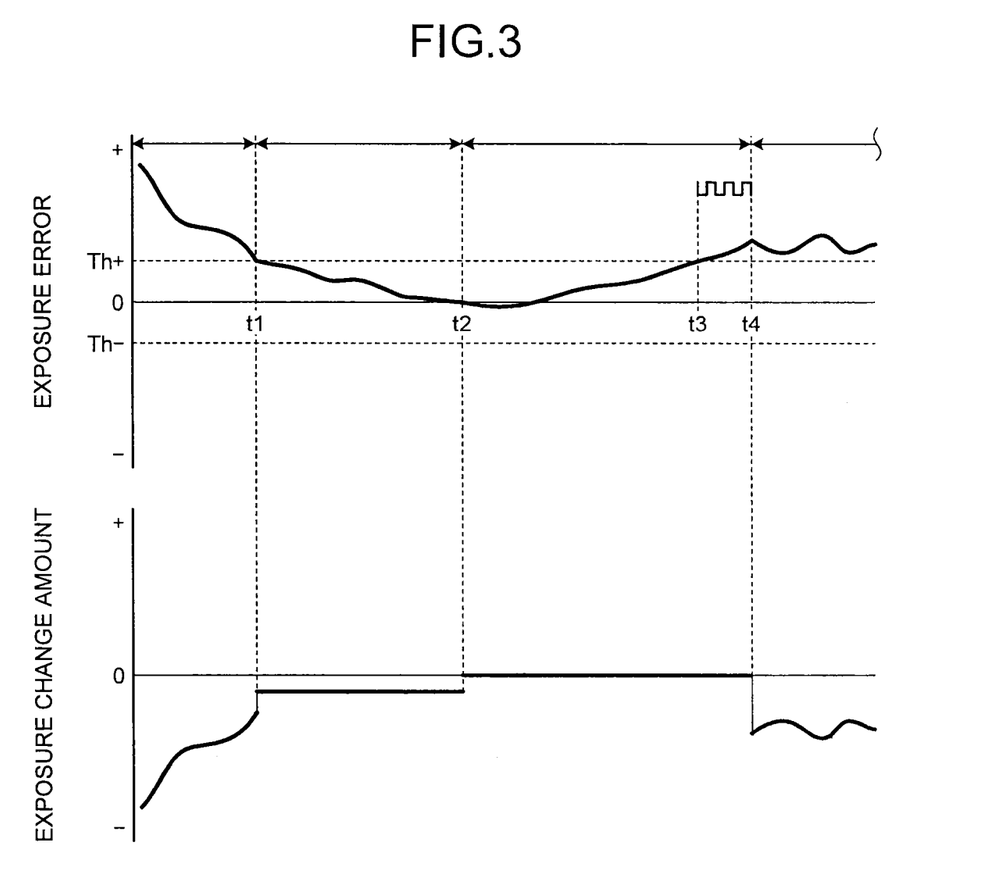
FIG. 3 is a timing chart explaining exposure control executed by an AE control unit.

FIG. 3 is a timing chart explaining the exposure control executed by the AE control unit. An upper portion in FIG. 3 illustrates an example of a change the exposure error due to the exposure control. In the exposure error, an excessive exposure (overexposure) is illustrated by plus, and an insufficient exposure (underexposure) is illustrated by minus. A horizontal axis illustrates a time.

A lower portion in FIG. 3 illustrates a transition of an exposure change amount due to the exposure control to the exposure error illustrated in the upper portion. The exposure change amount corresponds to a derivative of a product obtained by multiplying the control amounts to the four factors i.e. the opening of the diaphragm 5, the exposure time, the AD sensitivity, and the digital gain. The exposure change amount is illustrated by plus when the exposure is increased and illustrated by minus when the exposure is reduced. A horizontal axis illustrates a time. Since the AE control unit 21 executes the exposure control by a negative feedback, a control polarity is made opposite to a polarity of the exposure error.

The AE control unit 21 holds a positive coring threshold value (Th+) and a negative coring threshold value (Th−) which are previously set as to the exposure error. A range from Th+ to Th− is called a coring range. The coring range is set including a zero level.

The AE control unit 21 executes the exposure control for converging the exposure error to the zero level. It is assumed that when the exposure control starts, the exposure error calculated by the exposure error calculating unit 20 is a value larger than Th+. The AE control unit 21 executes proportional control for reducing the exposure in the state that the exposure error is larger than Th+. The proportional control is first exposure control for causing the exposure change amount to be proportional to the exposure error amount. The AE control unit 21 calls the exposure control when the exposure error calculated by the exposure error calculating unit 20 is out of the coring range first exposure control. The AE control unit 21 adjusts the exposure in a polarity direction where the exposure error becomes the zero level. When, for example, the exposure error is smaller than Th− contrary to the illustrated example, the AE control unit 21 executes proportional control for increasing the exposure.

It is assumed that the exposure error has reached Th+ at a time t1 by the proportional control of the AE control unit 21. The AE control unit 21 switches the proportional control that is the first exposure control to a creep operation that is second exposure control at the time t1. The exposure change amount is more reduced in the second exposure control than in the first exposure control. The AE control unit 21 makes it possible to switch the exposure control for converging the exposure error to the zero level between the first exposure control and the second exposure control. When the exposure error has reached within the coring range by the first exposure control, the AE control unit 21 switches the exposure control from the first exposure control to the second exposure control.

The creep operation executed from the time t1 sets the exposure change amount to a fixed amount and adjusts the exposure in the polarity direction where the exposure error becomes the zero level. Since the creep operation gradually changes the exposure at a fixed ratio, brightness of an apparent image can be monotonously and naturally changed.

It is assumed that the exposure error has reached the zero level at a time t2 by the creep operation of the AE control unit 21. The AE control unit 21 stops the exposure control at the time t2. The AE control unit 21 stops the exposure control from a time at which the exposure error has reached the zero level by the second exposure control to a time at which the exposure error has been out of the coring range. When the exposure control is stopped, the brightness of apparent image does not change by holding the exposure at the time t2. When brightness of the object is changed by a change of a video picture scene and the like, the exposure error varies from zero level.

It is assumed that the exposure error has reached Th+ at a time t3 after the exposure control executed by the AE control unit 21 had been stopped. The AE control unit 21 measures a period during which the exposure error has been out of the coring range. The AE control unit 21 measures the period by counting, for example, a number of frames in which the exposure error has been out of the coring range. At a time t4 at which a preset period has passed from the time t3, the AE control unit 21 releases the stop of the exposure control and executes the proportional control that is the first exposure control again.

As described above, the AE control unit 21 executes the proportional control before the time t1 the and after the time t4. The AE control unit 21 executes the creep operation between the time t1 and the time t2. The AE control unit 21 stops the exposure control between the time t2 and time t4. The AE control unit 21 transits a phase of the exposure control in a sequence of the proportional control, the creep operation, and the stop of the exposure control.

Figure 4:
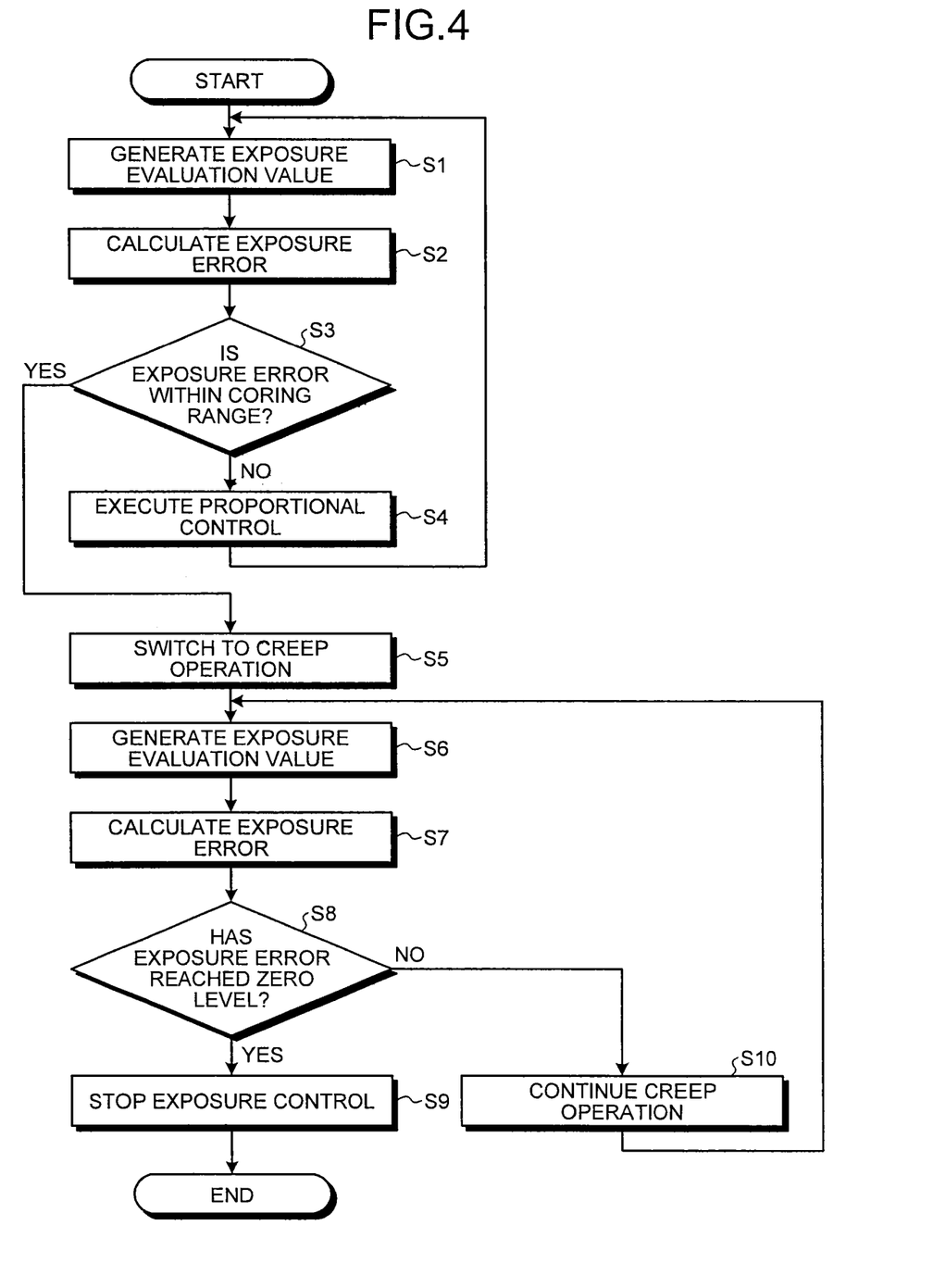
FIG. 4 is a flowchart illustrating a procedure from a start of the exposure control executed by the exposure control unit to a stop of the exposure control.

FIG. 4 is a flowchart illustrating a procedure from a start to a stop of the exposure control executed by the exposure control unit. The exposure evaluation value generating unit 19 executes the light amount measurement and generates the exposure evaluation value (step S1). The exposure error calculating unit 20 calculates the exposure error using the exposure evaluation value generated at step S1 (step S2).

The AE control unit 21 determines whether or not the exposure error calculated at step S2 is within the coring range (step S3). When the exposure error is out of the coring range (step S3, No), the AE control unit 21 executes the proportional control (step S4). During the period in which the exposure error is out of the coring range, the AE control unit 21 repeats the procedure from step S1 to step S4 and continues the proportional control.

When the exposure error is within the coring range (step S3, Yes), the AE control unit 21 switches the exposure control from the proportional control to the creep operation (step S5). The exposure evaluation value generating unit 19 executes the light amount measurement from the time the creep operation starts and generates the exposure evaluation value (step S6). The exposure error calculating unit 20 calculates the exposure error using the exposure evaluation value generated at step S6 (step S7).

The AE control unit 21 determines whether or not the exposure error calculated at step S7 has reached the zero level (step S8). When the exposure error has not reached the zero level (step S8, No), the AE control unit 21 continues the creep operation (step S10). During the period in which the exposure error reaches the zero level, the AE control unit 21 repeats the operations from step S6 to step S8 and step S10 and continues the creep operation at step S10. When the exposure error has reached the zero level (step S8, Yes), the AE control unit 21 stops the exposure control (step S9).

Figure 5:
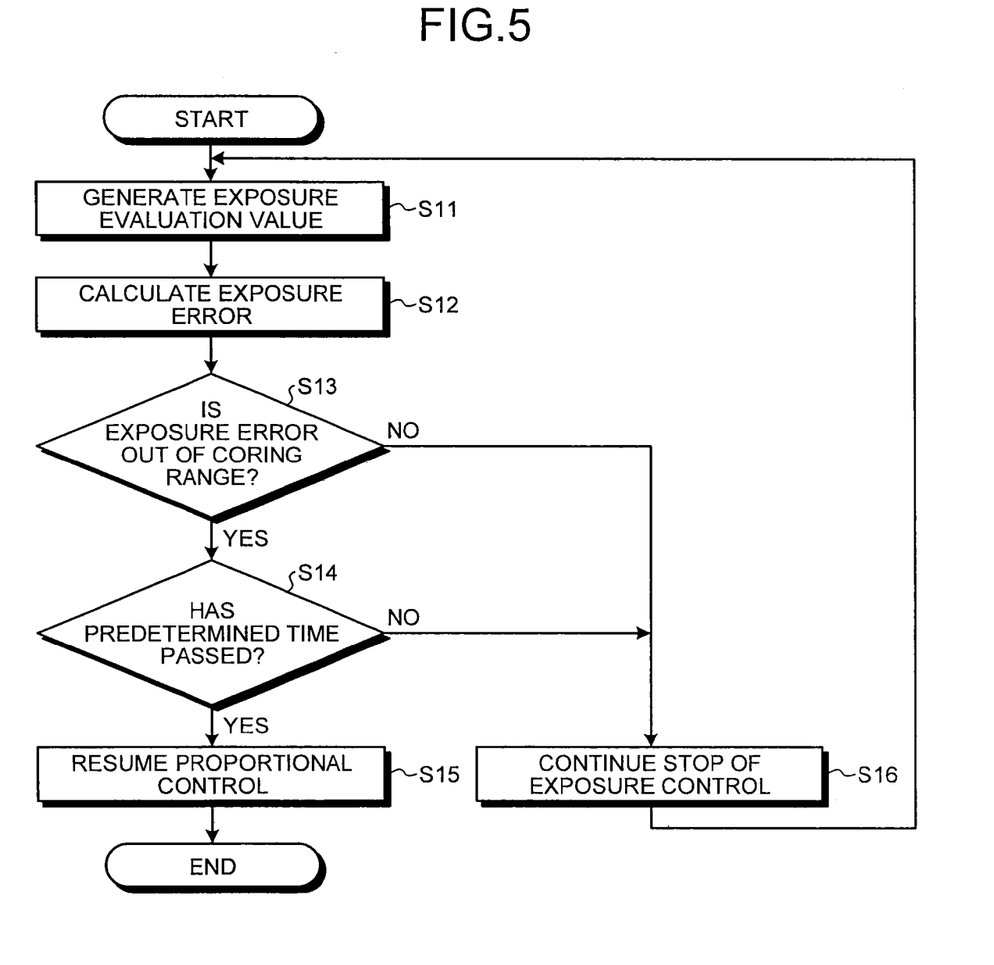
FIG. 5 is a flowchart illustrating a procedure from a time at which the exposure control is stopped by the procedure illustrated in FIG. 4 to a time at which the exposure control is resumed.

FIG. 5 is a flowchart illustrating a procedure until the exposure control is resumed after the exposure control has been stopped by a procedure illustrated in FIG. 4. The exposure evaluation value generating unit 19 executes the light amount measurement after the exposure control has been stopped at step S9 and generates the exposure evaluation value (step S11). The exposure error calculating unit 20 calculates the exposure error using the exposure evaluation value generated at step S11 (step S12).

The AE control unit 21 determines whether or not the exposure error calculated at step S12 becomes out of the coring range (step S13). When the exposure error is within the coring range (step S13, No), the AE control unit 21 continues the stop of the exposure control (step S16). During the period until the exposure error is out of the coring range, the AE control unit 21 repeats the operations from step S11 to step S13 and step S16 and continues the stop of the exposure control at step S16.

When the exposure error is out of the coring range (step S13, Yes), the AE control unit 21 determines whether or not a preset and predetermined time has passed from a time at which the exposure error had been out of the coring range (step S14). When the predetermined time has not passed (step S14, No), the AE control unit 21 continues the stop of the exposure control (step S16). Until the predetermined time has passed, the AE control unit 21 repeats the operations from step S11 to step S14 and step S16 and continues the stop of the exposure control at step S16.

When the predetermined time has passed (step S14, YES), the AE control unit 21 resumes the proportional control that is the first exposure control (step S15). The AE control unit 21 continues the exposure control and the stop of the exposure control.

The camera module 2 according to the embodiment makes it to possible to execute the exposure control sufficiently in order to achieve the correct exposure by causing the exposure error to reach the zero level by the first and second exposure control. After the correct exposure has been reached once, the camera module 2 stops the exposure control until the exposure error becomes out of the coring range. After an exposure has been converged to the correct exposure, the camera module 2 stops executing the exposure control following a slight change of brightness so that a circumstance, in which brightness of a picked-up image changes unnaturally in an eyesore way, can be suppressed. As a result, the camera module 2 can obtain an easily viewable image.

Since the camera module 2 resumes the exposure control waiting that a predetermined time has passed after the exposure error has changed from the zero level to out of the coring range, the camera module 2 suppresses that the phase transits excessively sensitively to a temporary variation of the exposure error. With the operation, the camera module 2 can obtain a natural image by executing the exposure control in which stability is emphasized.

Note that the AE control unit 21 is not limited to the case in which the AE control unit 21 resumes the proportional control after confirming that the exposure error has been out of the coring range after the exposure error had reached the zero level by the second exposure control and the exposure control had been stopped. The AE control unit 21 may resume the proportional control without confirming that the exposure error has been out of the coring range after the exposure control had been stopped. For example, the AE control unit 21 may resume the proportional control regardless whether or not the exposure error has been out of the coring range after the preset and predetermined time had passed after the stop of the exposure control.

Figure 6:
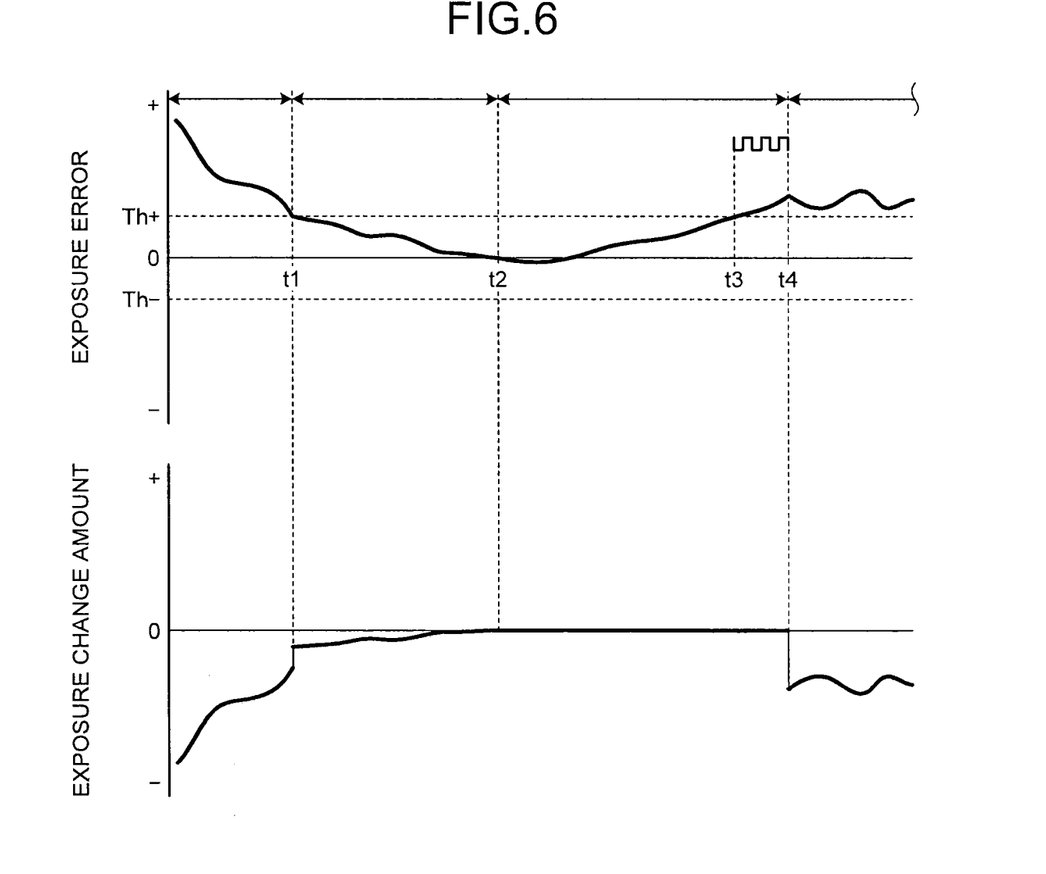
FIG. 6 is a timing chart explaining exposure control executed by an AE control unit included in a camera module according to a second embodiment.

FIG. 6 is a timing chart explaining exposure control executed by an AE control unit included in a camera module according to a second embodiment. The camera module 2 according to the embodiment has a configuration similar to that of the camera module 2 according to the first embodiment (refer to FIG. 1). An explanation which duplicates that of the first embodiment will be appropriately omitted.

An upper portion in FIG. 6 illustrates an example of a change of exposure error due to exposure control. In the exposure error, an excessive exposure (overexposure) is illustrated by plus, and an insufficient exposure (underexposure) is illustrated by minus. A horizontal axis illustrates a time. A lower portion in FIG. 6 illustrates a transition of an exposure change amount by the exposure control to the exposure error illustrated in the upper portion. The exposure change amount is illustrated by plus when an exposure is increased and illustrated by minus when an exposure is reduced. A horizontal axis illustrates a time.

An AE control unit 21 executes the exposure control for converging the exposure error to a zero level. It is assumed that, when the exposure control starts, the exposure error calculated by an exposure error calculating unit 20 is a value larger than Th+. The AE control unit 21 executes proportional control for reducing an exposure in the state that the exposure error is larger than Th+. The proportional control is first exposure control for causing the exposure change amount to be proportional to the exposure error. The AE control unit 21 executes proportional control for causing the exposure change amount to be associated with the exposure error by a first gain as the first exposure control.

It is assumed that the exposure error has reached Th+ at a time t1 by the proportional control executed by the AE control unit 21. At the time t1, the AE control unit 21 switches the proportional control that is the first exposure control to proportional control that is a second exposure control. As the second exposure control, the AE control unit 21 executes the proportional control for causing the exposure change amount to be associated with the exposure error by a second gain. It is assumed that the second gain is lower than the first gain.

In the proportional control by the second gain executed from the time t1, the exposure is adjusted in a polarity direction where the exposure error becomes the zero level while gradually reducing the exposure change amount. In the proportional control by the second gain, since the exposure is gradually changed as compared with the proportional control by the first gain, brightness of an apparent image can be monotonously and naturally changed.

It is assumed that the exposure error has reached the zero level at a time t2 by the proportional operation executed by the AE control unit 21. At the time t2, the AE control unit 21 stops the exposure control. The AE control unit 21 stops the exposure control until the exposure error has been out of a coring range from the time at which the exposure error had reached the zero level by the second exposure control. A procedure from stopping of the exposure control to resuming thereof is the same as the first embodiment. The AE control unit 21 transits a phase of the exposure control in a sequence of the proportional control by the first gain, the proportional control by the second gain, and the stop of the exposure control.

Also in the second embodiment, the camera module 2 can obtain an easily viewable image by sufficiently executing the exposure control to achieve a correct exposure and suppressing an unnatural change of brightness of a picked-up image.

Note that the AE control unit 21 is not limited to the case in which the AE control unit 21 resumes the proportional control after confirming that the exposure error has been out of the coring range after the exposure error had reached the zero level by the second exposure control and the exposure control had been stopped. The AE control unit 21 may resume the proportional control without confirming that the exposure error has been out of the coring range after the exposure control had been stopped. For example, the AE control unit 21 may resume the proportional control regardless whether or not the exposure error has been out of the coring range after the preset and predetermined time had passed after stopping the exposure control.

Figure 7:
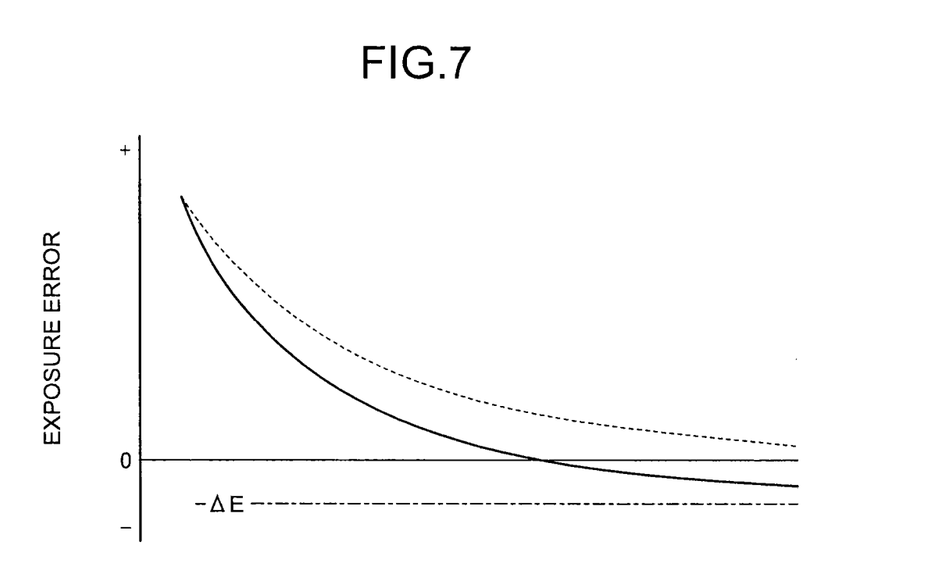
FIG. 7 is a graph explaining exposure control in a modification of the second embodiment.

FIG. 7 is a view explaining exposure control in a modification of the second embodiment. In the modification, the AE control unit 21 sets a sight for converging the exposure error to a level lower than the zero level in the second exposure control at the time the exposure is excessive.

In FIG. 7, an example of a transition of the exposure error at the time the sight for converging the exposure error is set to the zero level is illustrated by a broken line, and a solid line illustrates an example of the transition of the exposure error at the time the sight is set to −ΔE lower than the zero level. When the proportional control that is the second exposure control is executed setting the sight to the zero level, a value of the exposure error nearer to the sight makes an exposure error change amount smaller. When the sight is set to the zero level, the exposure error is caused to reach the zero level at a greatly delayed time unless the exposure error is not deviated to the zero level side by an influence of a disturbance and the like.

In contrast, when the proportional control that is the second exposure control is executed setting the sight to −ΔE, the exposure error can be certainly caused to reach the zero level at an earlier time by converging the exposure error toward −ΔE. Also in the modification, the AE control unit 21 stops the exposure control at the time the exposure error has reached the zero level. As described above, the camera module 2 can executes the exposure control for stabilizing the exposure at an early time.

In the second exposure control executed when the exposure is insufficient, the AE control unit 21 sets the sight for converging the exposure error to a level higher than the zero level. When the exposure is excessive and when the exposure is insufficient, the AE control unit 21 makes it possible to execute the exposure control for stabilizing the exposure at an early time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera module comprising:
circuitry configured to
execute a light amount measurement using an image signal obtained by picking up an object image and generate an exposure evaluation value that is a result of measurement of the light amount,
calculate an exposure error showing a deviation of the exposure evaluation value to an exposure target value for achieving a correct exposure, and
execute exposure control in an exposure change amount according to the exposure error, wherein
the circuitry permits the exposure control for converging the exposure error to a zero level to be switched between first exposure control and second exposure control in which the exposure change amount is reduced than at the time of the first exposure control,
the circuitry sets the exposure control at the time the exposure error calculated by the circuitry is out of a coring range set including the zero level as the first exposure control,
when the exposure error has reached within the coring range by the first exposure control, the circuitry switches the exposure control from the first exposure control to the second exposure control, and
when the exposure error has reached the zero level by the second exposure control, the circuitry stops the exposure control.

2. The camera module according to claim 1, wherein the circuitry stops the exposure control until the exposure error has been out of the coring range after the time when the exposure error had reached the zero level by the second exposure control.

3. The camera module according to claim 1, wherein the circuitry executes proportional control for causing the exposure change amount to be proportional to the exposure error as the first exposure control.

4. The camera module according to claim 3, wherein the circuitry makes the exposure change amount constant by the second exposure control.

5. The camera module according to claim 3, wherein the circuitry executes the proportional control for causing the exposure change amount to be associated with the exposure error by a first gain as the first exposure control and executes proportional control for causing the exposure change amount to be associated with the exposure error by a second gain that is lower than the first gain as the second exposure control.

6. The camera module according to claim 5, wherein, in the second exposure control at the time an exposure is excessive, the circuitry sets a sight for converging the exposure error to a level lower than the zero level and, in the second exposure control at the time an exposure is insufficient, the circuitry sets the sight to a level higher than the zero level.

7. The camera module according to claim 2, wherein, after a preset period has passed from a state in which the exposure error had become out of the coring range while the exposure control had being stopped, the circuitry executes the first exposure control.

8. The camera module according to claim 1, wherein the circuitry integrates luminance values of respective pixels and uses a result of the integration as the exposure evaluation value.

9. An exposure adjusting method of a camera module, comprising:
   executing a light amount measurement using an image signal obtained by picking up an object image;
   generating an exposure evaluation value that is a result of measurement of the light amount;
   calculating an exposure error showing a deviation of the exposure evaluation value to an exposure target value for achieving a correct exposure; and
   executing exposure control in an exposure change amount according to the exposure error, wherein
   permitting the exposure control for converging the exposure error to a zero level to be switched between first exposure control and second exposure control in which the exposure change amount is reduced than at the time of the first exposure control;
   executing the first exposure control as the exposure control at the time the exposure error has been out of the coring range set including the zero level;
   switching the exposure control from the first exposure control to the second exposure control when the exposure error has reached within the coring range by the first exposure control; and
   stopping the exposure control when the exposure error has reached the zero level by the second exposure control.

10. The exposure adjusting method of the camera module according to claim 9, wherein the exposure control is stopped until the exposure error has been out of the coring range after the time when the exposure error had reached the zero level by the second exposure control.

11. The exposure adjusting method of the camera module according to claim 9, wherein proportional control for causing the exposure change amount to be proportional to the exposure error is executed as the first exposure control.

12. The exposure adjusting method of the camera module according to claim 11, wherein the exposure change amount is made constant by the second exposure control.

13. The exposure adjusting method of the camera module according to claim 11, wherein the proportional control for causing the exposure change amount to be associated with the exposure error by a first gain is executed as the first exposure control and proportional control for causing the exposure change amount to be associated with the exposure error by a second gain that is lower than the first gain is executed as the second exposure control.

14. The exposure adjusting method of the camera module according to claim 13, wherein, in the second exposure control at the time an exposure is excessive, a sight for converging the exposure error to a level lower than the zero level is set and, in the second exposure control at the time an exposure is insufficient, the sight is set to a level higher than the zero level.

15. The exposure adjusting method of the camera module according to claim 10, wherein, after a preset period has passed from a state in which the exposure error is out of the coring range while the exposure control is being stopped, the first exposure control is executed.

16. The exposure adjusting method of the camera module according to claim 9, wherein luminance values of respective pixels are integrated and a result of the integration is used as the exposure evaluation value.

17. An electronic equipment comprising:
   a camera module configured to pick up an object image, the camera module including circuitry configured to
     execute a light amount measurement using an image signal obtained by picking up the object image and generate an exposure evaluation value that is a result of measurement of the light amount,
     calculate an exposure error showing a deviation of the exposure evaluation value to an exposure target value for achieving a correct exposure, and
     execute exposure control in an exposure change amount according to the exposure error, wherein
   the circuitry permits the exposure control for converging the exposure error to a zero level to be switched between first exposure control and second exposure control in which the exposure change amount is reduced than at the time of the first exposure control,
   the circuitry sets the exposure control at the time the exposure error calculated by the circuitry is out of a coring range set including the zero level as the first exposure control,
   when the exposure error has reached within the coring range by the first exposure control, the circuitry switches the exposure control from the first exposure control to the second exposure control, and
   when the exposure error has reached the zero level by the second exposure control, the circuitry stops the exposure control.

18. The electronic equipment according to claim 17, wherein the circuitry stops the exposure control until the exposure error has been out of the coring range after the time when the exposure error had reached the zero level by the second exposure control.

19. The electronic equipment according to claim 17, wherein the circuitry executes proportional control for causing the exposure change amount to be proportional to the exposure error as the first exposure control and making the exposure change amount constant by the second exposure control.

20. The electronic equipment according to claim 17, wherein the circuitry executes the proportional control for causing the exposure change amount to be associated with the exposure error by a first gain as the first exposure control and executes proportional control for causing the exposure change amount to be associated with the exposure error by a second gain that is lower than the first gain as the second exposure control.

* * * * *